US009945173B2

(12) United States Patent
Boyer, Jr.

(10) Patent No.: US 9,945,173 B2
(45) Date of Patent: Apr. 17, 2018

(54) AIRCRAFT CARGO DOOR SHIELD

(71) Applicant: Cargo Door Armor LLC, Seattle, WA (US)

(72) Inventor: William J. Boyer, Jr., Lakewood, WA (US)

(73) Assignee: Cargo Door Armor LLC, Seattle, WA (US)

(*) Notice: Subject to any disclaimer, the term of this patent is extended or adjusted under 35 U.S.C. 154(b) by 0 days.

(21) Appl. No.: 14/359,356

(22) PCT Filed: Nov. 21, 2012

(86) PCT No.: PCT/US2012/066409
§ 371 (c)(1),
(2) Date: May 20, 2014

(87) PCT Pub. No.: WO2013/119305
PCT Pub. Date: Aug. 15, 2013

(65) Prior Publication Data
US 2015/0082707 A1 Mar. 26, 2015

Related U.S. Application Data

(60) Provisional application No. 61/562,631, filed on Nov. 22, 2011.

(51) Int. Cl.
B64C 1/14 (2006.01)
E06B 3/30 (2006.01)
(Continued)

(52) U.S. Cl.
CPC ............ *E06B 3/308* (2013.01); *B64C 1/1415* (2013.01); *B64F 1/005* (2013.01); *E06B 9/01* (2013.01); *E06B 2009/015* (2013.01)

(58) Field of Classification Search
CPC ... B64C 1/1415; B64C 1/1423; B64C 1/1461; B64D 45/00; E06B 3/308; B60J 11/06
See application file for complete search history.

(56) References Cited

U.S. PATENT DOCUMENTS 3,591,940 A * 7/1971 Slemmons ................ G09F 1/10
40/603
4,041,999 A * 8/1977 Miller ...................... B60J 11/06
150/166
(Continued)

FOREIGN PATENT DOCUMENTS

SU 573937 A 1/1984
WO 2009/063071 5/2009
WO WO 2009063071 A2 * 5/2009 ........... B64C 1/1415

*Primary Examiner* — Katherine W Mitchell
*Assistant Examiner* — Johnnie A. Shablack
(74) *Attorney, Agent, or Firm* — George C. Rondeau, Jr.; Davis Wright Tremaine LLP

(57) ABSTRACT

An aircraft cargo door shield releasably attachable to an aircraft cargo door and configured for protecting an aircraft cargo door during loading and unloading of cargo. The aircraft cargo door shield includes a panel configured for covering a portion of an external skin of the cargo door, and one or more fastening or attachment mechanisms configured for releasably holding the panel adjacent to the cargo door during use. The aircraft cargo door shield may include upper attachment mechanisms having elongated hooks that may engage an upper edge of the aircraft cargo door. Some or all of the attachment mechanisms may be coupled to tension members to retain the engagement of the attachment mechanisms to the aircraft cargo door during use.

14 Claims, 5 Drawing Sheets

(51) Int. Cl.
 *B64F 1/00* (2006.01)
 *E06B 9/01* (2006.01)

(56) References Cited

U.S. PATENT DOCUMENTS

| | | | | | |
|---|---|---|---|---|---|
| 4,073,452 | A | * | 2/1978 | Gosau | B64C 1/14 244/118.5 |
| 4,154,416 | A | * | 5/1979 | Bruce et al. | 244/129.5 |
| 4,220,298 | A | * | 9/1980 | Willis | B64C 1/1407 160/354 |
| 4,372,364 | A | * | 2/1983 | Katz | E06B 7/28 150/154 |
| 4,375,876 | A | * | 3/1983 | Stewart | B64C 1/1438 160/201 |
| 4,773,802 | A | * | 9/1988 | Rewis | B60P 7/04 105/374 |
| 5,123,223 | A | * | 6/1992 | Makarevich | B44C 5/0446 206/325 |
| 5,255,727 | A | * | 10/1993 | Saruwatari | E04G 21/30 150/154 |
| 5,603,194 | A | * | 2/1997 | Fridlyand | E06B 3/7001 109/49.5 |
| 5,649,390 | A | * | 7/1997 | Davidson | B44C 5/00 160/179 |
| 5,664,554 | A | * | 9/1997 | Martin | F24C 15/36 126/201 |
| 5,799,992 | A | * | 9/1998 | Kojima | B60J 11/06 280/770 |
| 5,937,587 | A | * | 8/1999 | Zinbarg | E06B 3/7001 52/222 |
| 6,029,409 | A | * | 2/2000 | Wilson | E04G 21/30 150/154 |
| 6,059,005 | A | * | 5/2000 | Zinbarg | 160/90 |
| 6,308,474 | B1 | * | 10/2001 | Wilson | 52/202 |
| 6,395,369 | B1 | * | 5/2002 | Randone | 428/99 |
| 7,040,938 | B2 | * | 5/2006 | Choi | B60F 3/0038 114/283 |
| 7,052,069 | B2 | * | 5/2006 | Vance | B60R 13/01 296/152 |
| 7,854,096 | B2 | * | 12/2010 | Brisbois | E06B 3/30 248/228.1 |
| 8,109,557 | B1 | * | 2/2012 | Salinas | F41H 5/16 280/770 |
| D691,940 | S | * | 10/2013 | Boyer, Jr. | D12/345 |
| 8,702,136 | B2 | * | 4/2014 | Azhagesan | B60J 11/06 293/126 |
| 8,746,762 | B2 | * | 6/2014 | Darrett | B60R 13/04 293/128 |
| 8,850,949 | B1 | * | 10/2014 | Lopez | F41H 5/24 109/49.5 |
| D719,678 | S | * | 12/2014 | Lopez | D25/48.3 |
| 9,108,717 | B2 | * | 8/2015 | Boyer, Jr. | B64C 1/1415 |
| 2007/0062136 | A1 | * | 3/2007 | Kim | E06B 3/7001 52/311.2 |
| 2008/0029227 | A1 | * | 2/2008 | Veldheer | B60J 1/08 160/180 |
| 2011/0121135 | A1 | * | 5/2011 | Maguire | 244/121 |
| 2014/0033612 | A1 | * | 2/2014 | Azhagesan | 49/460 |

* cited by examiner

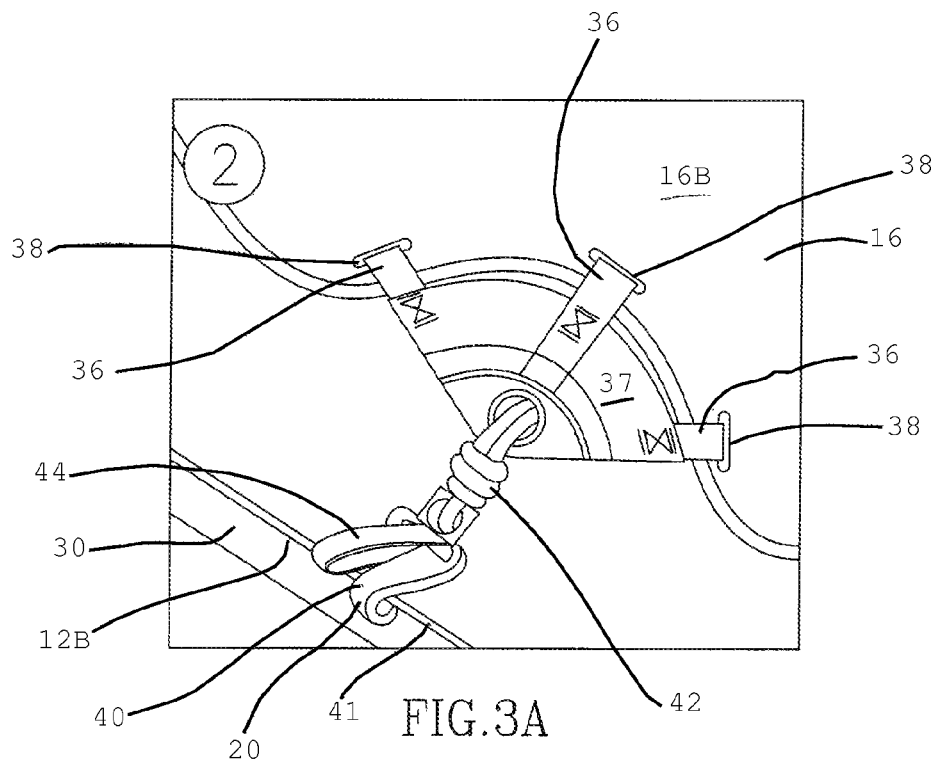
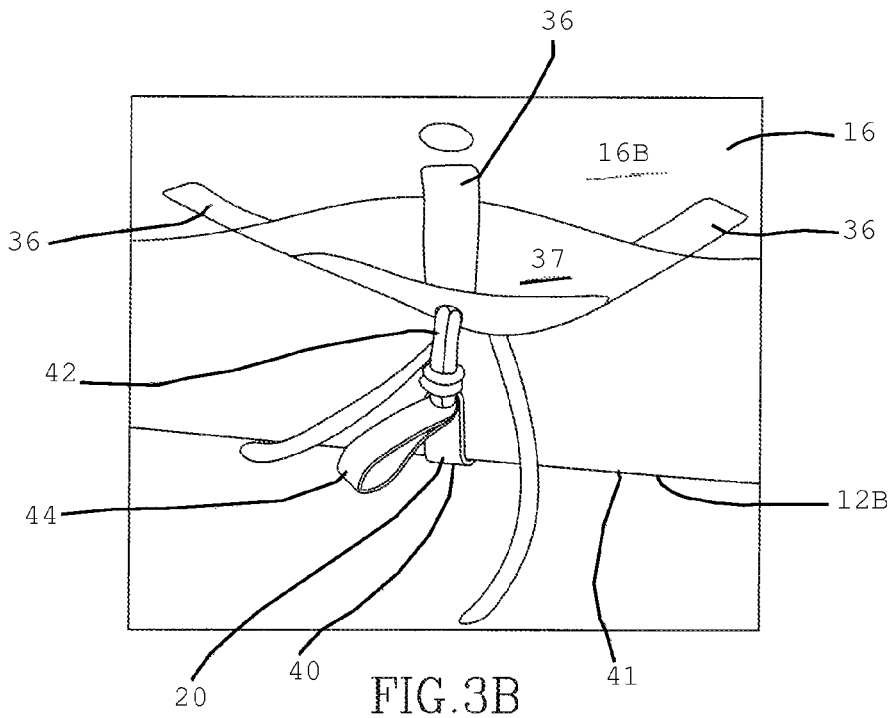

AIRCRAFT CARGO DOOR SHIELD

BACKGROUND OF THE INVENTION

Field of the Invention

The present invention is directed generally to the protection of aircraft cargo doors from damage during the loading and unloading of cargo, and more particularly to an aircraft cargo door shield releasably attachable to cargo doors.

Description of the Related Art

Aircraft cargo doors are often configured to open inwardly with respect to the fuselage of the aircraft. This configuration exposes the external skin of the cargo door to contact by cargo during loading and unloading. Damage to the external skin of the cargo door may prevent the aircraft from operating normally and could present a safety hazard. Due to strict safety procedures governing the airline industry, the severity of any damage caused to the aircraft must be investigated to ensure the safety of the aircraft and may result in repair or replacement processes. These inspections and/or maintenance events may lead to delays for passengers, disruption of flight schedules, and financial loss to the airline.

BRIEF DESCRIPTION OF THE SEVERAL VIEWS OF THE DRAWING(S)

FIGS. 3A and 3B illustrate a lower attachment mechanism of the aircraft cargo door shield of FIG. 1.

DETAILED DESCRIPTION OF THE INVENTION

Figure 1:
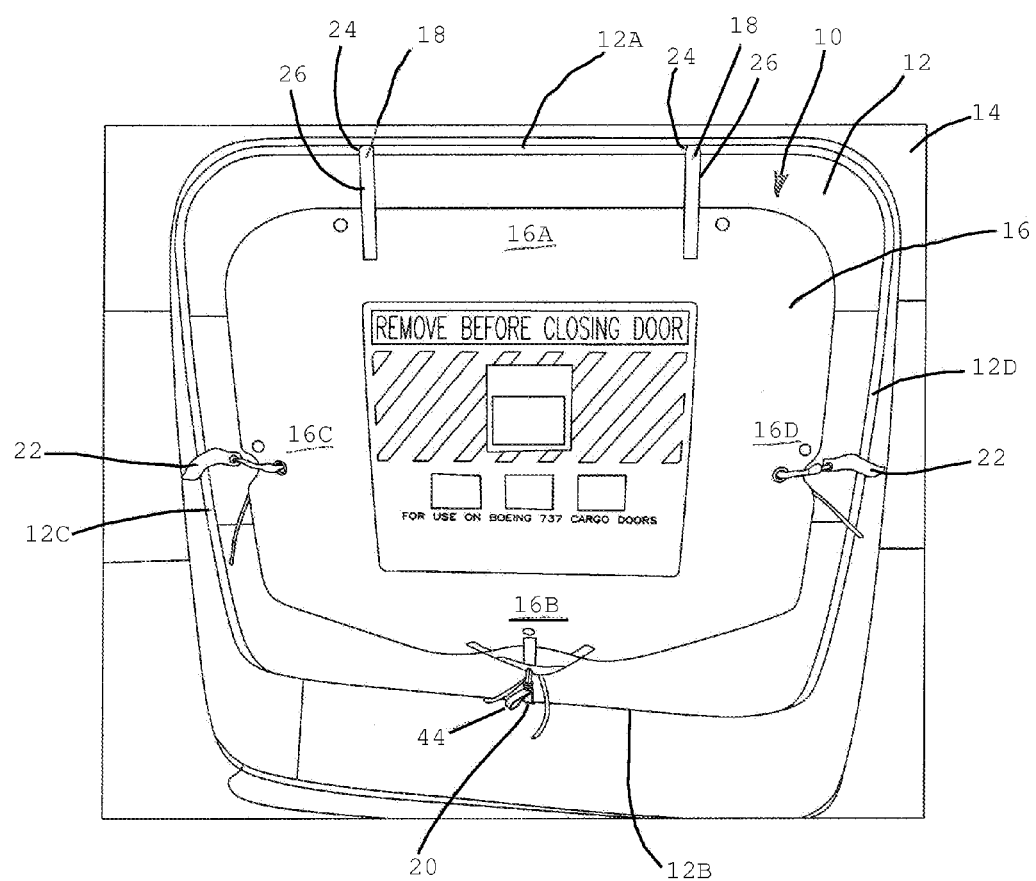
FIG. 1 is a front view of an aircraft cargo door shield releasably attached to a partially open cargo door of an aircraft in accordance with an exemplary embodiment of the present invention.

Embodiments of the present invention are directed to an aircraft cargo door shield 10 configured for protecting an aircraft cargo door 12 during loading and unloading of cargo. Referring to FIG. 1, a cargo door shield 10 is shown releasably attached to a partially open cargo door 12 of an aircraft 14. The cargo door 12 is configured to open inwardly with respect to the fuselage of the aircraft. As an example, the cargo door may be a cargo door of a Boeing 737. The cargo door shield 10 comprises a panel 16 configured for covering a portion of an external skin of the cargo door, and one or more fastening or attachment mechanisms configured for releasably holding the panel adjacent to the cargo door during use. In the embodiment shown, the panel 16 is sized and shaped to cover and therefore protect a substantial portion of the exterior skin of the cargo door from being damaged by contact during the loading and unloading of cargo.

The panel 16 of the cargo door shield 10 may be made from any suitable materials. In some embodiments, the panel is constructed from a lightweight material configured to enable, for example, a single user to removably attach the panel to the cargo door without assistance. The panel may be constructed from material that has a relatively high impact strength and thickness, which enables it to withstand impacts from cargo during loading and unloading thereof without damage occurring to the cargo door. Examples of suitable materials include, but are not limited to, composites or polymers, such as polypropylene or high-density polyethylene.

The dimensions of the panel are configured to complement the dimensions of a cargo door of an aircraft, as shown in FIG. 1. It will be appreciated that the dimensions of the panel may be configured to complement the dimensions of various sizes of cargo doors for various types of aircrafts. The shape of the panel may also be configured to match the external shape of the cargo door. For example, the panel, having an outward side and an inward side, may be configured to follow the generally convex curvature of the external skin of the cargo door so that the inward side of the panel is held adjacent to the external skin of the cargo door during use.

Figure 2A:
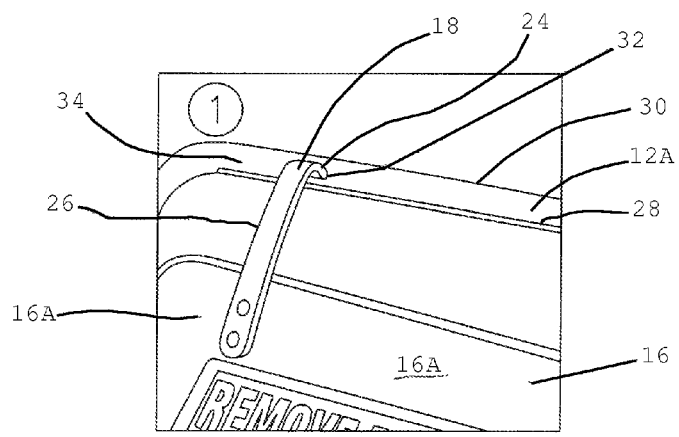
FIG. 2A is an enlarged view of an upper attachment mechanism of the aircraft cargo door shield shown in FIG. 1.
Figures 2B, 2C:
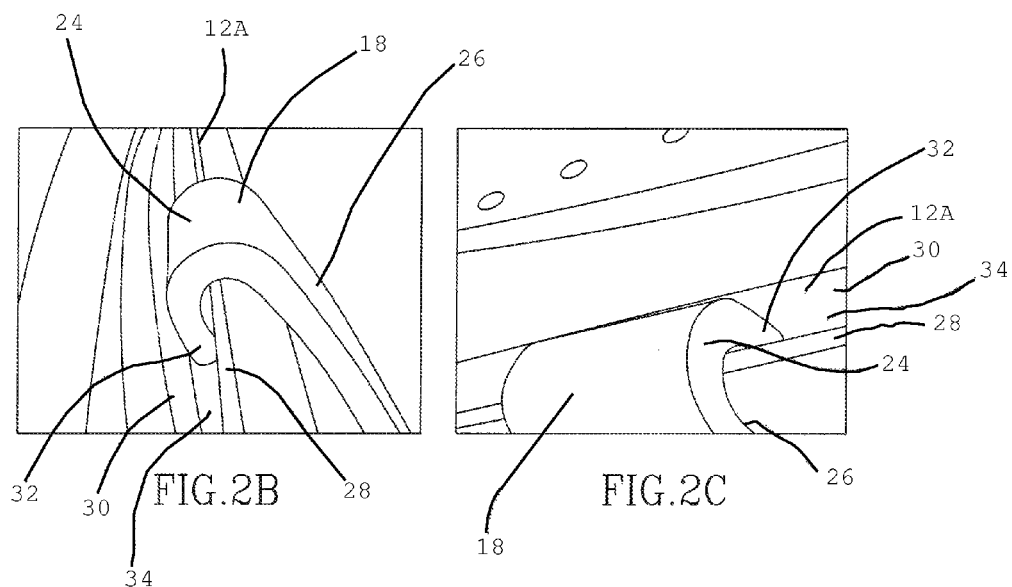
FIG. 2B depicts the attachment mechanism shown in FIG. 2A positioned over an upper edge of the external skin of the cargo door.
FIG. 2C is another view of the attachment mechanism shown in FIG. 2A.
Figure 4A:
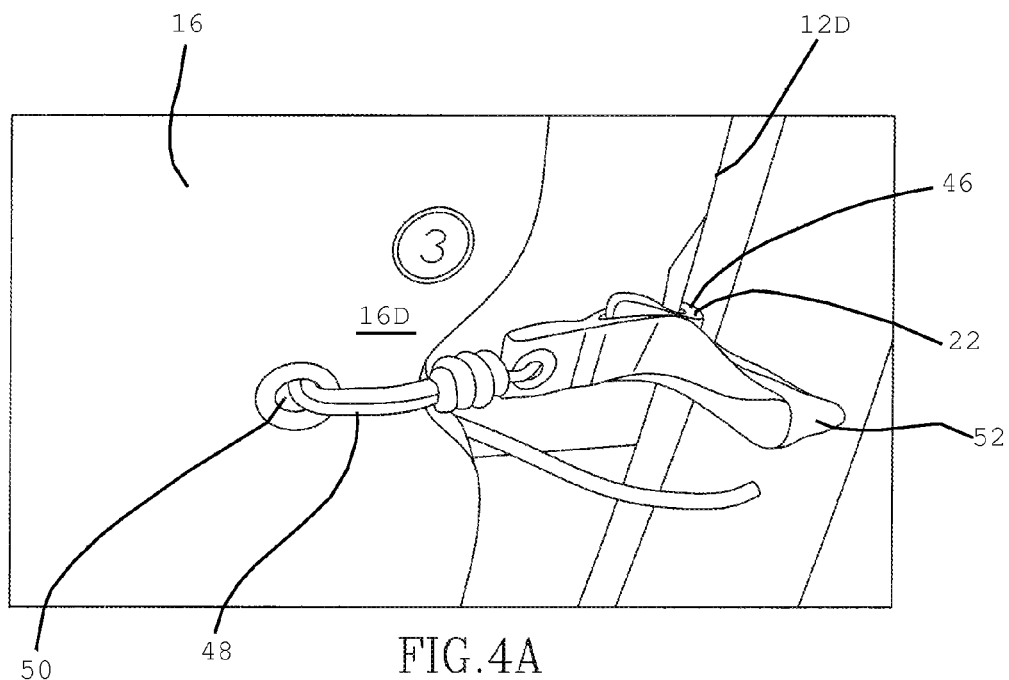
FIGS. 4A and 4B illustrate a lateral attachment mechanism of the aircraft cargo door shield of FIG. 1.
Figure 4B:
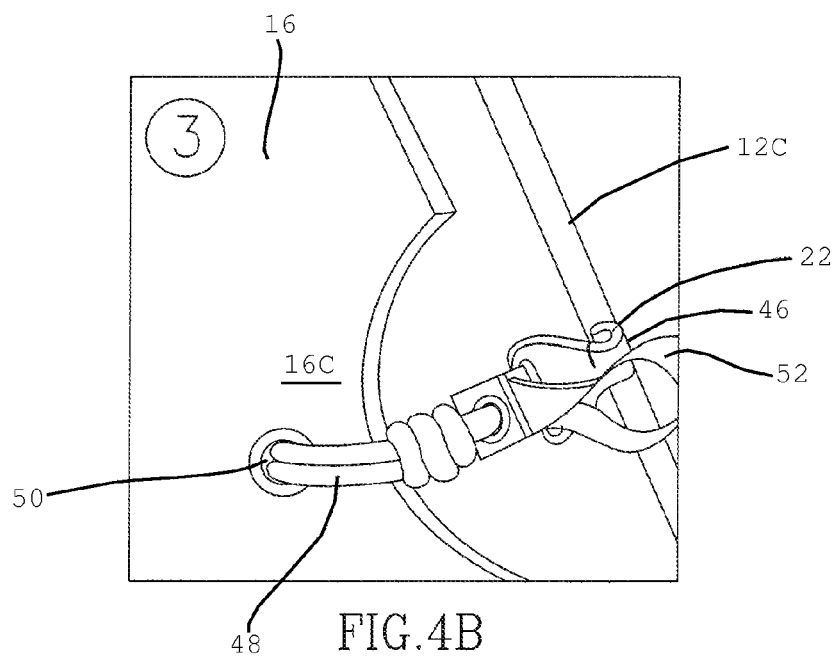
Figure 5:
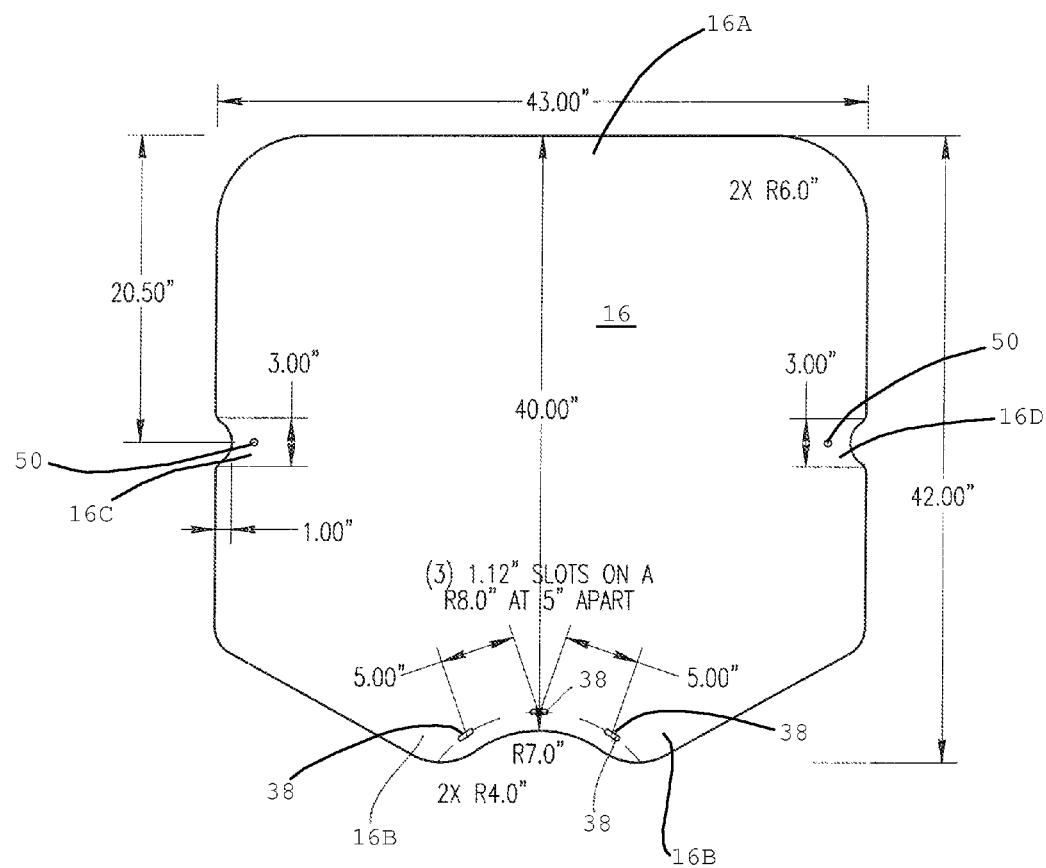
FIG. 5 illustrates a schematic diagram including dimensions of the aircraft cargo door shield of FIG. 1 sized for a particular size cargo door.

As shown in FIG. 1, the cargo door 12 of the aircraft 14 is hingedly attached to the fuselage of the aircraft at the cargo door's upper end 12A. The cargo door 12 includes a lower free end 12B located substantially opposite the hinged end and two lateral edges 12C and 12D extending between the hinged end and the free end. In this embodiment, the cargo door shield 10 includes a plurality of attachment mechanisms located around the periphery of the panel, each configured for removable attachment to corresponding edges of the external skin of the cargo door. The attachment mechanisms 18 that are attachable to the cargo door at its upper hinged end 12A are shown in FIGS. 2A, 2B, and 2C. The attachment mechanisms 20 that are attachable to the cargo door at its lower free end 12B are shown in FIGS. 3A and 3B. The attachment mechanisms 22 that are attachable to the cargo door at its lateral edges 12C and 12D are shown in FIGS. 4A and 4B. It should be appreciated that in some embodiments, various combinations including some or all of the attachment mechanisms may be used. For example, in some embodiments, the cargo door shield may only include attachment mechanisms on its upper and lateral edges, or on its upper and lower edges, etc.

As shown in FIGS. 2A, 2B, and 2C, the two upper attachment mechanisms 18 each comprise an elongated hook 24 with a shank portion 26 coupled to the upper portion 16A of the panel 16. Each hook 24 is configured to have a relatively small depth hooked portion so that it may slide over the contour of the cargo door and into position to engage the upper edge 28 of the cargo door without disturbing or damaging a gasket 30 of the cargo door (see FIGS. 2B and 2C). The tip portion 32 of the hooked portion of the hook 24 has a thickness to fit in the space 34 between the inside surface of the edge 28 of the upper end 12A of the cargo door 12 and the gasket 30. As can be appreciated, this feature prevents damage to the gasket that may otherwise occur if a differently-sized attachment mechanism was used which engaged the gasket.

As shown in FIGS. 3A and 3B, the attachment mechanism 20 coupled to the panel 16 at its lower end 16B comprises a planer, sector-shaped piece of material 37 coupled to the lower portion of the panel by three straps 36 that are threaded through holes 38 in the panel 16 and sewn to the piece of material. The attachment mechanism 20 also comprises a hook 40, somewhat similar to the hooks 24 shown in FIGS. 2A-2C, configured to have a relatively small depth hooked portion so that it can be engaged with the lower edge 41 of the cargo door 12 at its lower free end 12B. Like the hooks described above, the hook shown in FIGS. 3A and 3B is shaped and sized with a tip portion of the hooked portion having thickness to fit in the space between the inside surface of the edge 41 of the lower end 12B of the cargo door 12 and the gasket 30 without contacting the gasket of the cargo door, thereby preventing potential damage to the gasket. The hook portion of the attachment mechanism 20 is coupled to the piece of material 37 by a tension member 42 (e.g., a shock cord or "bungee" cord). The attachment mechanism also includes a looped handle 44 that is configured to aid a user in engaging the hooked portion over the lower edge 41 by pulling downward on the handle so as to stretch the tension member 42 to a length that enables the hooked portion to engage the lower edge at the lower free end 12B of the cargo door 12. The tension member 42 operates to retain the engagement of hooked portion with the lower edge of the cargo door.

FIGS. 4A and 4B illustrate enlarged views of the lateral attachment mechanisms 22 that are releasably attachable to the lateral edges 12C and 12D of the external skin of the cargo door 12. The attachment mechanisms 22 each include a hook 46 coupled proximate a lateral edge 12C/12D of the panel 16 by a tension member 48 (e.g., a shock cord) that is looped through a hole 50 in the panel. Similar to the lower attachment mechanism shown in FIGS. 3A and 3B and described above, the lateral attachment mechanisms 22 also include a looped handle 52 configured to aid the user when stretching the tension member 48 to engage a hooked portion with the lateral edge of the cargo door with a tip portion of the hooked portion having a thickness to fit in the space between the inside surface of the lateral edge 12C/12D of the cargo door 12 and the gasket 30 without contacting the gasket to prevent damage to the gasket.

During installation of the cargo door shield 10, a single user may first position the cargo door 12 in an inwardly partially open position such as shown in FIG. 1. Next, the user may position the upper hooks 24 on the exterior skin of the cargo door near, but below, the upper hinged end 12A. While holding the shield such that its upper end is substantially parallel with the upper edge 28 of the cargo door, the user may simply raise the shield and slide the upper hooks 24 in an upward direction along the exterior skin until the hooked portion of the hooks extend over the upper edge 28 of the external skin and move inward at a position above the upper edge as a result of either or both of the inward force applied by the user to the shield or the resiliency of the shield panel. The shield 10 may next be lowered to position the portions of the hooked portions of both hooks 24 in the space 34 between the upper edge 28 of the cargo door 12 and the gasket 30. The shield 10 will then be "hanging" on the cargo door 12 from the upper edge 28 of the cargo door. Once the shield is hanging on the cargo door, the user does not need to continue lifting the shield, such that the user's hands are free to releasably attach the lateral attachment mechanisms 22 and/or the lower attachment mechanism 20 to the external skin of the cargo door. Thus, the cargo door shield 10 is easily installed by a single user and does not damage the gasket 30 that seals the cargo door 12. Further, by providing the upper hooks 24 and the looped handles 44 and 52, the cargo door shield is easily installed by a user wearing gloves, which is often the case. In a reverse procedure, the shield 10 may be easily removed from the cargo door 12 by a single user.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A shield for protecting an aircraft cargo door of a commercial aircraft, the aircraft cargo door configured to open inwardly with respect to a fuselage of the commercial aircraft from a closed position to an inwardly open position to permit loading or unloading of cargo, the cargo door having an upper edge at a hinged upper end of the cargo door, the upper edge having an inside surface and a gasket attached to the cargo door at the hinged upper end and spaced inwardly apart from the inside surface of the upper edge in a thickness direction of the cargo door to define a space between the inside surface and the gasket, comprising:
- a panel configured to protect the aircraft cargo door against damage due to impact from the cargo, the panel having a vertical dimension smaller than a height of the aircraft cargo door;
- an upper hook coupled to the panel proximate an upper end of the panel and configured to engage the upper edge of the cargo door at the hinged upper end of the cargo door to attach the panel to the cargo door when the cargo door is in the inwardly open position, the upper hook having a shank portion extending upwardly at an upper edge of the panel and a hooked portion with a tip portion configured to fit within the space between the inside surface of the upper edge of the cargo door and the gasket attached to the cargo door at the hinged upper end, the tip portion configured to fit between the inside surface and the gasket of the upper edge of the cargo door without downwardly compressing the gasket when the cargo door is in the inwardly open position and the upper hook is engaged with the upper edge of the cargo door; and
- an attachment mechanism coupled to the panel proximate an end of the panel other than the upper end, the attachment mechanism including an elastic member.

2. The shield of claim 1 for use with the cargo door having a lower edge at a free lower end of the cargo door, wherein the attachment mechanism comprises a lower hook configured to engage the lower edge of the cargo door at the free lower end of the cargo door opposite the hinged upper end.

3. The shield of claim 2 for use with the cargo door having a lateral edge of the cargo door, wherein the attachment mechanism also comprises a lateral hook configured to engage the lateral edge of the cargo door.

4. The shield of claim 1 for use with the cargo door having a lower edge at a free lower end of the cargo door, a first lateral edge and a second lateral edge opposite the first lateral edge, wherein the attachment mechanism comprises a lower hook configured to engage the lower edge of the cargo door at the free lower end of the cargo door opposite the hinged upper end, a first lateral hook configured to engage the first lateral edge of the cargo door, and a second lateral hook configured to engage the second lateral edge of the cargo door opposite the first lateral edge.

5. The shield of claim 1 for use with the cargo door, wherein the shank portion has a lower end directly attached to the panel and the hooked portion is disposed at an upper end of the shank portion.

6. The shield of claim 1 wherein the upper edge of the aircraft cargo door has an exterior surface opposite the inside surface, and the hooked portion of the upper hook includes a base portion spaced apart from the tip portion at a predetermined distance less than a distance between the gasket and the exterior surface.

7. The shield of claim 1 for use with the cargo door, wherein the attachment mechanism further comprises a second hook configured to engage with a second edge of the cargo door at a side other than the hinged upper end of the cargo door, and a handle attached at the second hook and configured to aid a user in engaging the second hook over the second edge.

8. The shield of claim 1 for use with the cargo door, wherein at least a portion of the upper hook and the panel have a convex curvature corresponding to an external convex surface of the cargo door.

9. The shield of claim 1 for use with the cargo door, wherein the panel is constructed of a polymer material.

10. The shield of claim 1 for use with the cargo door, wherein the panel is constructed of a composite material.

11. A shielded aircraft door of a commercial aircraft, comprising:
- an aircraft cargo door of a commercial aircraft, the aircraft cargo door configured to open inwardly with respect to a fuselage of the commercial aircraft from a closed position to an inwardly open position to permit loading or unloading of cargo, the cargo door having an upper edge at a hinged upper end of the aircraft cargo door, the upper edge having an inwardly facing inside surface and a gasket attached to the aircraft cargo door at the hinged upper end and spaced inwardly apart from the inside surface of the upper edge in a thickness direction of the cargo door to define a space between the inside surface and the gasket;
- a panel configured to protect the aircraft cargo door against damage due to impact from cargo during loading and unloading of the cargo, the panel having a vertical dimension smaller than a height of the aircraft cargo door;
- an upper hook coupled to the panel proximate an upper end of the panel and configured to engage the upper edge of the aircraft cargo door at the hinged upper end of the aircraft cargo door to attach the panel to the cargo door when the cargo door is in the inwardly open position to removably attach the panel thereto, the upper hook having a shank portion extending upwardly at an upper edge of the panel and a hooked portion with a tip portion configured to fit within the space between the inside surface and the gasket attached at the hinged upper end, the tip portion configured to fit between the inside surface and the gasket of the upper edge of the cargo door without downwardly compressing the gasket when cargo door is in the inwardly open position and the upper hook is engaged with the upper edge of the aircraft cargo door; and
- an attachment mechanism coupled to the panel proximate an end of the panel other than the upper end, the attachment mechanism including an elastic member.

12. The shielded aircraft door of claim 11, the aircraft cargo door further including a lower edge at a free lower end of the aircraft cargo door, wherein the attachment mechanism comprises a lower hook configured to engage the lower edge of the aircraft cargo door at the free lower end of the aircraft cargo door opposite the hinged upper end.

13. The shielded aircraft door of claim 12, the aircraft cargo door further including a lateral edge, wherein the attachment mechanism also comprises a lateral hook configured to engage the lateral edge of the aircraft cargo door.

14. The shielded aircraft door of claim 12, the aircraft cargo door further including a first lateral edge and a second lateral edge opposite the first lateral edge, a first lateral hook configured to engage the first lateral edge of the cargo door, and a second lateral hook configured to engage the second lateral edge of the cargo door opposite the first lateral edge.

* * * * *